(12) United States Patent
Meyers

(10) Patent No.: US 9,436,853 B1
(45) Date of Patent: Sep. 6, 2016

(54) METHODS AND APPARATUS FOR COMBINING TEMPERATURE DATA FROM SEPARATE SEGMENTS OF HANDLING

(75) Inventor: Richard C. Meyers, Longboat Key, FL (US)

(73) Assignee: GlobalTrak, LLC, Sterling, VA (US)

( * ) Notice: Subject to any disclaimer, the term of this patent is extended or adjusted under 35 U.S.C. 154(b) by 199 days.

(21) Appl. No.: 13/407,515

(22) Filed: Feb. 28, 2012

Related U.S. Application Data

(60) Provisional application No. 61/447,998, filed on Mar. 1, 2011.

(51) Int. Cl.
*H04Q 5/22* (2006.01)
*G06K 19/07* (2006.01)
*G06K 7/00* (2006.01)

(52) U.S. Cl.
CPC ......... *G06K 7/0008* (2013.01); *G06K 19/0723* (2013.01)

(58) Field of Classification Search
CPC ...... G06Q 10/08; G06Q 10/06; G06F 9/542; B60R 21/015
USPC ............... 340/10.1, 505, 5.61, 572.4, 572.1, 340/539.13
See application file for complete search history.

(56) References Cited

U.S. PATENT DOCUMENTS

| | | | |
|---|---|---|---|
| 6,353,225 B1* | 3/2002 | Strzoda et al. | 250/339.13 |
| 6,927,688 B2* | 8/2005 | Tice | 340/539.26 |
| 7,009,517 B2* | 3/2006 | Wood | 340/572.1 |
| 7,468,650 B2* | 12/2008 | Childress et al. | 340/5.92 |
| 2003/0007473 A1* | 1/2003 | Strong | G01S 5/02 370/338 |
| 2005/0209813 A1* | 9/2005 | Kautz et al. | 702/130 |
| 2007/0221727 A1* | 9/2007 | Reznik | 235/383 |
| 2008/0040179 A1* | 2/2008 | Masermann et al. | 705/8 |

* cited by examiner

*Primary Examiner* — Vernal Brown

(57) ABSTRACT

A system and method for improving supply chain visibility is provided. According to a preferred embodiment, an electronic manifest may be downloaded and linked or attached to an existing purchase order. This electronic manifest is preferably designed to accepted data from RFID devices and other sensors. Further, the electronic manifest is preferably configured to be easily accessed the carriers or others in the chain of custody. According to a further aspect of the present invention, sensor-enabled RFID tags may be employed to track a product through the supply chain, capture temperature data, and to calculate shelf life.

1 Claim, 3 Drawing Sheets

Method for Combining Sensor Data from Separate Segment of Handling

METHODS AND APPARATUS FOR COMBINING TEMPERATURE DATA FROM SEPARATE SEGMENTS OF HANDLING

PRIORITY CLAIM

The present invention claims priority to U.S. Provisional Application No. 61/447,998, filed Mar. 1, 2011.

BACKGROUND AND FIELD OF THE PRESENT INVENTION

1. Field of the Present invention

The present invention relates generally to food, pharmaceutical, and chemical cold chains and, more particularly, to creating a full temperature history "from creation to consumption" using a sensor-enabled RFID chip on which data can indicate how many minutes a product remains in a specific temperature range.

2. Background of the Invention

Recently, the Food and Drug Administration (FDA) has passed regulations that implement the Bioterrorism. Act. These new regulations impact all suppliers in the food and drug industries. Specifically, the FDA has mandated that records must identify the previous source and subsequent recipient of food and pharmaceuticals in the U.S. supply chain, along with specific details of the product itself.

Because of the high costs and increasing regulatory demands for better inventory control resulting from the Bioterrorism Act, suppliers and logistics service providers are seeking systems that will be capable of tracking products from creation to consumption. Further, suppliers have a growing need to account for all segments of handling within the cold chain.

3. Description of Related Art

RFID is a wireless identification system which conventionally includes a RFID reader, tags, local software infrastructure and a back-end system. The RFID tag is the identification device in the system and normally includes at least a microchip attached to an antenna that sends data to a RFID reader. The RFID tag contains a unique serial number, and can also contain additional data. RFID tags can be active, passive, or semi-passive tags.

In operation, the RFID reader transmits RF signals. This electromagnetic field generated by the reader powers each RFID tag and enables it to send back information stored on the chip. A passive tag is an RFID tag that does not contain a power source. The semi-passive tags are a class of RFID tags that contain a power source, such as a battery, to communicate with the reader. Semi-passive tags might be dormant until activated by a signal from a reader. This conserves battery power and can lengthen the life of the tag. Active RFID tags contain a power source, such as a battery, to power the microchip's circuitry. Active tags transmit a signal to a reader and can be read from 100 feet (35 meters) or more. A sensor enabled RFID tag is an RFID tag which contains a sensor to monitor some physical parameter (e.g. Temperature) but also contains the same identification function that a standard RFID tag does. The functionality of the sensor enabled tags is supported by battery power.

At present, RFID tags are not used extensively within the food tracking industry. Accordingly, most food tracking and monitoring is performed by hand and in reliance on a single temperature gauge within a container. When the shipment is later broken up, there is no record for any individual product which the purchaser may receive.

With the latest improvement in RFID technology, the cost of sensor-enabled RFID tags has been significantly reduced. Accordingly, it has become increasingly more practical to use sensor-enabled RFID tags on individual products and to integrate them into existing shipping container monitoring systems, supply chain storage facilities, and transactional segments. However, the basic memory capacity and battery power within a RFID tag is limited. Further, a full temperature history "from creation to consumption" relying solely on individual RFID tags is not practical or useful for all products or for all situations especially where the IT infrastructure is limited. Accordingly, there is a significant need to develop a collaborative supply chain management system which incorporates available RFID technologies in new ways without burdening either shippers or infrastructure providers.

SUMMARY OF THE PRESENT INVENTION

To meet the need for enhanced cold-chain visibility and better recordkeeping, the present invention provides a system that uses radio frequency identification (RFID), sensors, and software. According to a preferred embodiment, an electronic manifest may be downloaded and linked or attached to an existing purchase order. This electronic manifest is preferably designed to accepted data from RFID devices and other sensors. Further, the electronic manifest is preferably configured to be easily accessed by the carriers or others in the chain of custody. According to a further aspect of the present invention, sensor-enabled RFID tags may be employed to track a product through the supply chain, capture temperature data, and to calculate shelf life. Further, additional software may be used to provide analysis tools based on statistical process methods.

According to the present invention, the use of sensor-enabled RFID tags on individual products and to integrate them into existing shipping container monitoring systems, supply chain storage facilities, and transactional segments. Through the use of the present invention, a more complete and accurate environmental condition history of the individual products from manufacturing to consumption may be established and retrieved. For instance, an accurate shelf life may be determined for an individual product or individual batch of products when they are delivered to the next owner. Further, the owner of the product may access the up-to-date or up-to-minute temperature history for any specific process.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
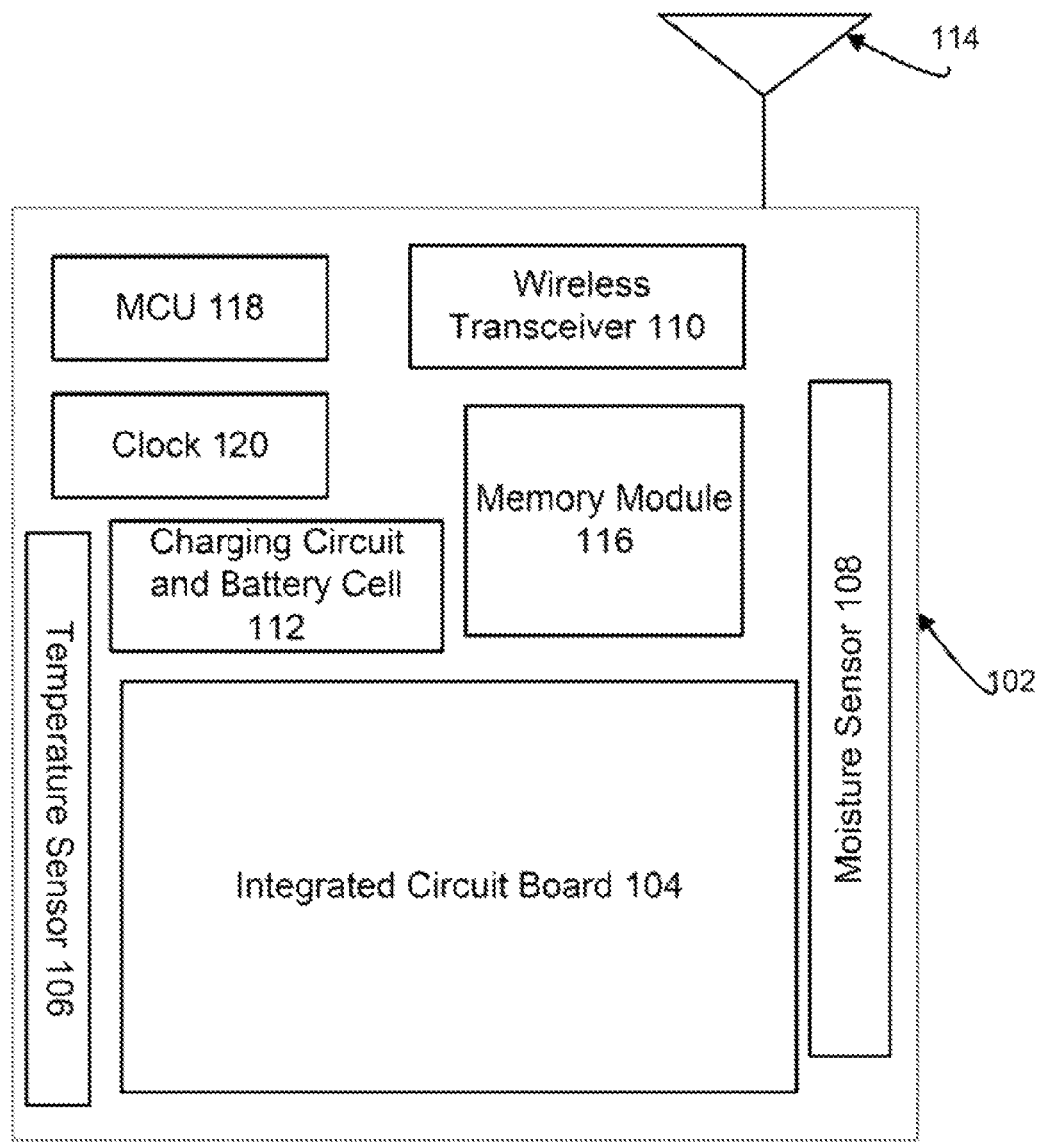
FIG. 1 is a block diagram of the present invention in accordance with an embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," and the like as used herein, are defined as a sequence of instructions designed for execution on a computer system. A program, computer program, or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Sensor Enabled RFID Tag

With reference now to FIG. 1, a block diagram in accordance with an embodiment of the present invention will now be discussed. As shown in FIG. 1, an RFID tag 102 having an integrated circuit board 104, a temperature sensor 106, a moisture sensor 108, a wireless transceiver 110, charging circuit and battery cell 112, an antenna 114, a memory module 116, a microcontroller unit 118, and a clock 120. Preferably, a RFID tag may be a semi-passive RFID tag or active RFID tag that periodically transmits telemetry to a base station allowing for remote measuring and reporting. The types of sensors integrated in the RFID tag system may be determined by the type of the environmental conditions it monitors. In monitoring most perishable products, the RFID tag may require a temperature sensor only. In some other applications, other sensors may be included in the RFID tag. A temperature sensing RFID tag may have the ability to collect temperature data in real time when a RFID reader is present and transmit the data in real time. Alternatively, a temperature sensing RFID tag may collect temperature data in pre-programmed intervals, store them in the memory module, and transmit the data later when the tag is queried by a RFID reader. Because of limited memory capacity in low cost. RFID tags, a sensor-enabled RFID tag may store the temperature history for several days to several weeks.

Figure 2:
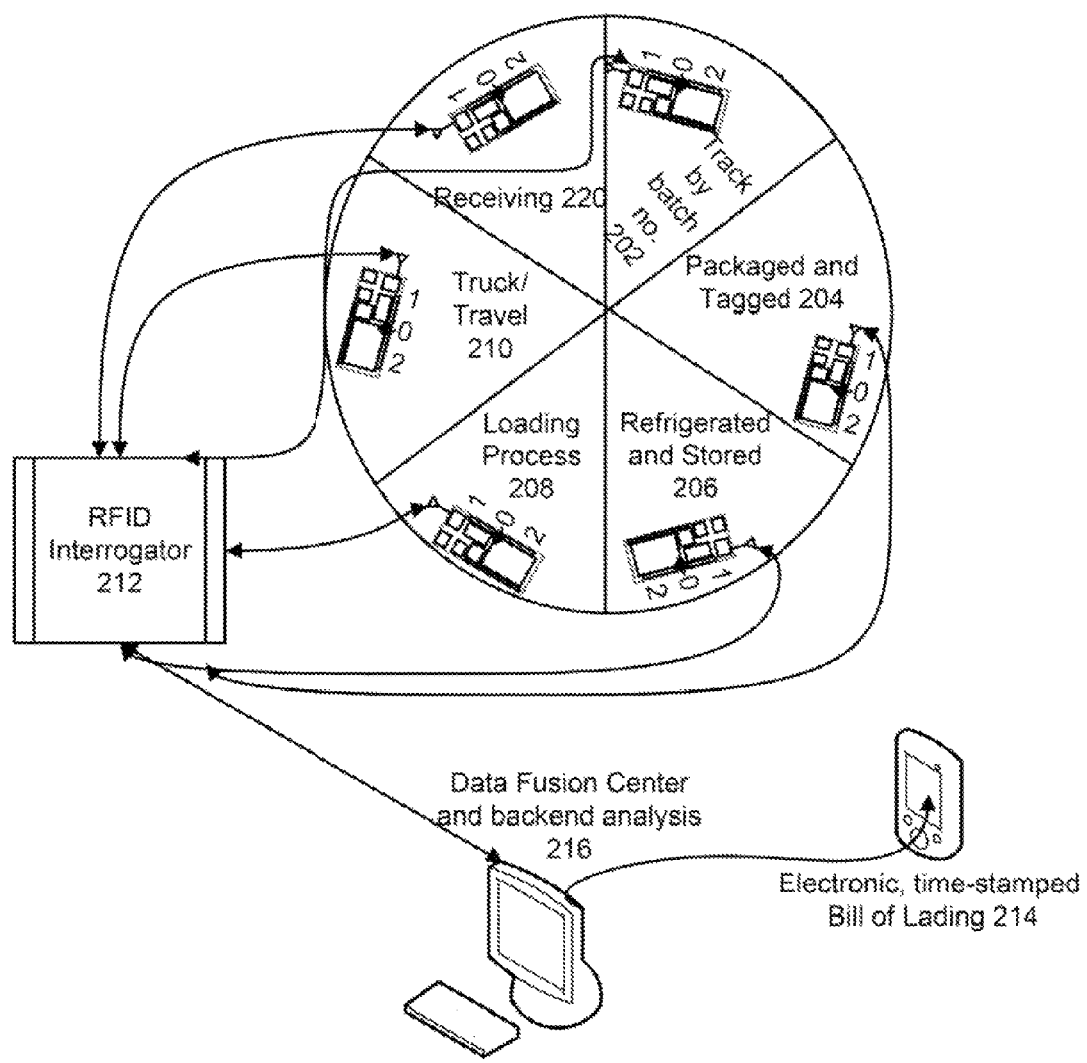
FIG. 2 is a functional configuration of the present invention in accordance with an embodiment of the present invention.

With reference now to FIG. 2, a functional configuration in accordance with the present invention will now be discussed. As shown in FIG. 2, for example, six segments of handling including manufacturing and processing 202 in which products by batch or lot number may receive packaging and tagging 104. During this phase, each item may receive a RFID tag 102 which remains with the item through the remaining segments of handling, refrigeration and storage 206, loading 208, travel 210 and receiving 220. Preferably, a RFID interrogator 212 is located at each segment of handling within range to enable preprogrammed interrogation of each RFID tag 102. Thereafter, each RFID interrogator 212 may forward the collected information to a data fusion center 216 which then processes and shares the data. Preferably, the data may be imported into a company's records, giving a company the ability to report statistics and data pertinent to each carrier, shipper, and product. The system may also create an electronic, time-stamped bill of lading 214, which will include the information regarding the chain of custody. With the RFID technology, companies can document the condition of the product from the time a batch is manufactured to the time that it is received resolving the issue of the chain of custody while the product is in transport.

Electronic Manifest

According to a further aspect of the present invention, an electronic manifest may be created and associated with group of products when they are transported together. According to a preferred embodiment of the present invention, the electronic manifest may be configured as a software application running on a mobile computing device such as a laptop computer, tablet or other handheld device. According to a preferred embodiment, such a mobile computing device preferably includes an RFID reader which is able to receive ID information from RFID tags. Further, the mobile computing device preferably is configured to interrogate RFID tags, other RFID readers and devices storing RFID data in order to collect RFID ID information and other recorded data which is associated with individual RFID tagged products.

Once the mobile computing device collects the RFID data and the associated environment data and the like, the collected data is preferably stored as an electronic manifest which then is associated with the transported products during their journey. During transport, electronic manifest may be physically transported with the goods (i.e. with the mobile device maintained by the carrier) and it may be maintained remotely and accessed electronically via an internet connection or the like.

According to a further aspect of the present invention, as the electronic manifest is maintained and as the goods are transported and/or stored, additional information and monitoring data from other sources may be incorporated into the stored data. For example, where a shipping container or carrier is equipped with its own monitoring system or sensors, the electronic manifest of present invention will preferably be configured to interrogate the monitoring system and add any data to the current manifest information.

Yet in another alternative preferred embodiment, a RFID reader may scan portion of products at certain time intervals as they are transported. Further, where bandwidth or processing power is limited, goods transported together may be only partially scanned so that an estimated condition for the entire load of products may be determined.

Further in accordance with the present invention, when monitored products are off-loaded or delivered to a receiver, the electronic manifest of the present preferably compiles and communicates the ID and history of the RFID tagged items for as much of the product life for which data is available. In this way, the environmental condition history derived from the RFID tag for each product may continue to travel with the tagged items and they may be later retrieved.

According to a further aspect of the present invention, as products go through various distribution channels, the product data is preferably forwarded and uploaded to a common data fusion center or the like which may be accessed by carriers and end-users. In this way, an accurate shelf life may be determined for an individual product or individual batch of products when they are delivered to an intermediate owner or final owner.

Active Monitoring and Data Analysis

According to a further aspect of the present invention, as the tagged products are transported and as data is collected, the measured sensor data and environmental conditions are preferably compared in near-real-time with the handling requirements for the transported goods. In this way, spoilage alerts and guidance can be generated. Such alerts and alarms may generated by the electronic manifest which is transported with the goods or by the back-end analysis provided by the data fusion center. Such analysis preferably includes the tracking of expiration dates, acceptable temperature ranges, spoilage calculations based on the time within specific temperate ranges, acceptable g-forces and the like. Further, such alerts and alarms may preferably include using geo-location data (i.e. via GPS or the like) and weather data (either historic, predicted or actual) to create alarms or warning for potential spoilage events. Further, such analysis may generate further warnings and guidance based on the detected mode of travel or periods of extended product storage.

In accordance with one aspect of the invention, under circumstances in which a product has been out of an acceptable temperature range for a specific period of time indicating spoilage, the RFID tag may become discolored or use some other means, for example, a temperature indicator strip, an indicator light or temperature dot, to visually alert carrier of spoilage. Preferably, the RFID tag will also electronically alert the shipper of the damages so that an automatic re-order of the replacements of each product that has been red flagged may be processed without further delay.

The present system also aids monitoring and record-keeping for safe, efficient operations and helps quality control assurance to improve the performance of a system. For example, manufacturers of pharmaceuticals and vaccines are required to keep documentation that products have been kept within an acceptable temperature range. The present invention may be used to provide this hard data and can therefore be used to improve the efficiency of the supply chain. The present invention may also allow a shipper time to react and save products which are not being stored properly but which still can be salvaged. The present invention may also allow a company to identify carrier malfunctions such as air leaks or refrigeration problems.

Processing System

Figure 3:
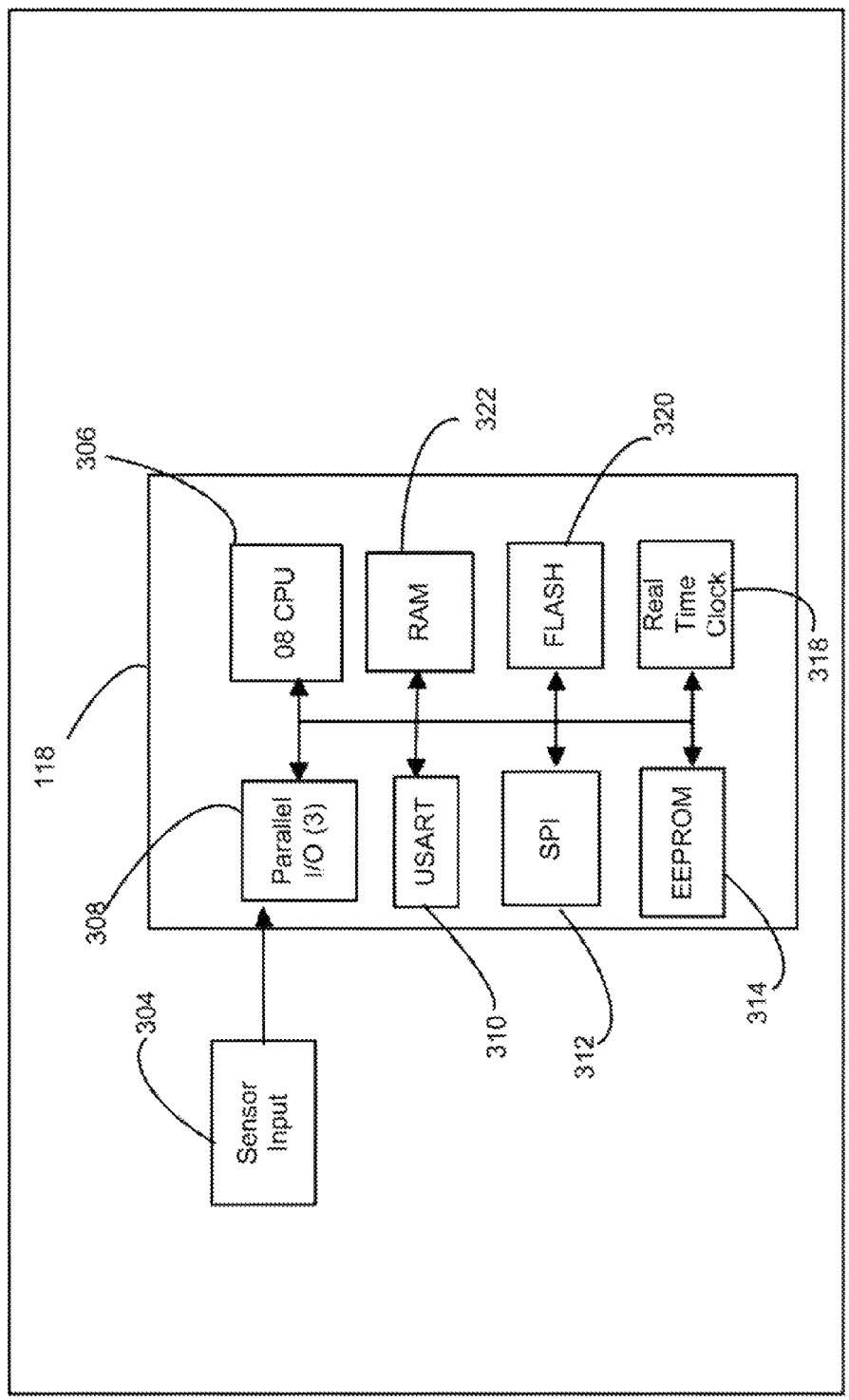
FIG. 3 is a block diagram of the microcontroller unit in accordance with an embodiment of the present invention.

With reference now to FIG. 3, it is preferred that the microcontroller unit 118 incorporates a the sensor input interface 304, a microprocessor 306, a real time clock 318, a general purpose Input/Output port to support external peripheral control 308, a Universal Synchronous/Asynchronous Receiver Transmitter (USART) 310, a Serial Port Interface (SPI) 312, and memory such as RAM 322, FLASH memory 320, and EEPROM 314 as shown.

Preferably, the microprocessor 306 used may be a low power, high performance, eight-bit intergrated circuit based on the Motorola HCS08 instruction set. The controller will preferably manage power and host the master date-time clock, communication scheduling and annotation of flash memory records.

Communication System

In accordance with a preferred embodiment of the present invention, the reporting may be made via a wireless connection to a satellite mode to communicate with a satellite system such as Globalstar™ or Orbcomm™. Preferably, such a satellite device will be a device such as the Axxon™, AutoTracker™, or the like, or a customized Orbcomm™ VHF satellite GPS tracking communications device which may be adapted with Zigbee™ interface antenna devices to incorporate them into the overall LAN architecture of the security system; these devices include a satellite transceiver, GPS receiver, a customized Zigbee™ wireless antenna with a serial (Ax Tracker™) or duplex (OrbComm™) interface.

In accordance with an alternative preferred embodiment of the present invention, the reporting may also be made using a wireless system independent from the satellite system. According to this embodiment, wireless signals may be transmitted to a wireless relay, base station or the like for routing and transmission to a chosen centralized location independent from or in combination with the transmissions made from the satellite system. In accordance with this alternative embodiment, signals may also be received by the communications manager and wireless interface from such external wireless networks as well.

According to a preferred embodiment of the present invention, it is preferred that the wireless communications used within the present invention will be based on the Zigbee™ (IEEE 802.15.4) standard. This standard transmits RF signals in the 2.4 GHz ISM band and operates with low power consumption due to its relatively slower data transmission rate (128 Kpps-250 Kbps). This approach enables additional capacity and flexibility of design through an up to 255 node pico-network. Communications are simplex or duplex in design, meaning that data can be assessed in either a push or pull process.

As referred to above, all communications of the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations.

Additional communications with the communications manager are preferably enabled via industry standard wired interfaces, with communications protocols implemented in firmware for future upgrade. These interfaces preferably will include at least two RS-322 compatible serial ports. These alternate serial ports may assist the communications manager to interface with additional remote sensors.

Remote Monitoring

To support and monitor the dataflow generated by the present invention, it is preferred that users establish a centralized location to collect and analyze data. This central location or "data fusion center" would preferably consolidate all tracking signals, sensor alarms and reports generated by the monitoring systems and provide further context and links with current intelligence.

Preferably, such a data fusion center will receive such source information in a variety of formats such as Electronic Data Interchange, XML, E-mail, HTML and flat text files. After receiving such data, the data fusion center preferably would act to process information to identify anomalies. With this data collected and processed, analyst may calculate statistics and probability of detection models used for decision support.

What is claimed is:

1. A system for monitoring the proper transport of selected items, the system comprising:
   a plurality of sensor enable RFID tags, wherein each sensor enable RFID tag is configured to send and receive RFID data and identification information related to a monitored item, further wherein each sensor enabled RFID tag is comprised of:
   a first sensing element, wherein the first sensing element is configured to produce environmental data;

a storage element, wherein the storage element is configured to store product storage information and environmental data; and a processing element, wherein the processing element is configured to analyze environmental data and stored product information to determine whether a monitored item is currently being maintained within desired environment conditions;

a coordinating RFID element, wherein the coordinating RFID element is configured to be attached to and transported with a group of monitored items; further wherein the coordinating RFID element is further configured to communicate with a plurality of sensor enable RFID tags attached to one or more monitored items; further wherein the coordinating RFID element is configured to receive a first set of environmental data from one or more sensor enabled RFID tags;

further wherein the coordinating RFID element is configured to receive a second set of environment data from a fixed monitoring element, wherein the fixed monitoring element is not attached to the monitored items and is configured to provide environmental data for a fixed monitored area;

wherein the coordinating RFID element is configured to trigger an alarm in response to an alarm event, wherein the alarm event is determined by the coordinating RFID element, further wherein the alarm event is determined based on a comparison of one or more stored acceptable temperature ranges for the monitored items and historic temperature data recorded by the fixed monitoring element for the fixed monitored area;

further wherein the coordinating RFID element is configured to store the first set of environment data and the second set of environment data.

* * * * *